US010138986B2

(12) United States Patent
Uchino

(10) Patent No.: US 10,138,986 B2
(45) Date of Patent: Nov. 27, 2018

(54) CONTINUOUSLY VARIABLE TRANSMISSION

(71) Applicant: HONDA MOTOR CO., LTD., Tokyo (JP)

(72) Inventor: Satoshi Uchino, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 45 days.

(21) Appl. No.: 15/535,538

(22) PCT Filed: Dec. 10, 2015

(86) PCT No.: PCT/JP2015/084732
§ 371 (c)(1),
(2) Date: Jun. 13, 2017

(87) PCT Pub. No.: WO2016/098686
PCT Pub. Date: Jun. 23, 2016

(65) Prior Publication Data
US 2017/0343090 A1  Nov. 30, 2017

(30) Foreign Application Priority Data

Dec. 16, 2014 (JP) ................................. 2014-254307

(51) Int. Cl.
*F16H 37/02* (2006.01)
*F16H 37/06* (2006.01)
*F16F 15/30* (2006.01)

(52) U.S. Cl.
CPC ......... *F16H 37/021* (2013.01); *F16H 37/065* (2013.01); *F16F 15/30* (2013.01); *F16H 2037/025* (2013.01)

(58) Field of Classification Search
CPC ........... F16H 2702/06; F16H 2037/023; F16H 2037/0873; F16H 2037/0886
(Continued)

(56) References Cited

U.S. PATENT DOCUMENTS 5,207,617 A * 5/1993 Kato ................. F16H 61/66259
474/28
6,997,831 B2 * 2/2006 Kanda ................... F16H 37/021
192/3.63
(Continued)

FOREIGN PATENT DOCUMENTS

DE           19631072 A1      2/1998
JP        2006-329338 A      12/2006
(Continued)

OTHER PUBLICATIONS

International Search Report dated Mar. 15, 2016, issued in counterpart International Application No. PCT/JP2015/084732 (2 pages).
(Continued)

*Primary Examiner* — Ha Dinh Ho
(74) *Attorney, Agent, or Firm* — Westerman, Hattori, Daniels & Adrian, LLP

(57) ABSTRACT

Provided is a continuously variable transmission that uses friction clutches as power transmission switching mechanisms but without increasing the number of shafts and the overall length. The power transmission switching mechanisms are configured to switch between establishing and interrupting power transmission in the power transmission paths within the continuously variable transmission. A continuously variable transmission includes an input shaft, a first output shaft, a second output shaft, a continuously variable transmission device, and four friction clutches. The continuously variable transmission device includes, a first pulley, mounted to the first output shaft, a second pulley, mounted to the second output shaft, and an endless belt, looped around the first pulley and the second pulley. A first friction clutch and a second friction clutch are coaxial with the input shaft. A third friction clutch is coaxial with the
(Continued)

second output shaft. A fourth friction clutch is coaxial with the first output shaft.

7 Claims, 9 Drawing Sheets

(58) Field of Classification Search
 USPC .................. 74/665, 665 R; 475/210, 213
 See application file for complete search history.

(56) References Cited

U.S. PATENT DOCUMENTS

| | | |
|---|---|---|
| 2006/0276293 A1 | 12/2006 | Koyama |
| 2007/0021259 A1* | 1/2007 | Tenberge ............... B60K 6/445 475/5 |
| 2015/0133257 A1 | 5/2015 | Uchino et al. |
| 2016/0109000 A1 | 4/2016 | Uchino et al. |

FOREIGN PATENT DOCUMENTS

| | | |
|---|---|---|
| JP | 2008-208854 A | 9/2008 |
| WO | 2013/175568 A1 | 11/2013 |
| WO | 2014/192752 A1 | 12/2014 |

OTHER PUBLICATIONS

Office Action dated Jan. 23, 2018, issued in counterpart Japanese Application No. 2016-564821 w/English translation.
Notice of Allowance dated Jul. 3, 2018, issued in counterpart Japanese Application No. 2016-564821 w/English translation.

* cited by examiner

US 10,138,986 B2

CONTINUOUSLY VARIABLE TRANSMISSION

TECHNICAL FIELD

The present invention relates to a continuously variable transmission including a continuously variable transmission device, such as a belt-driven continuously variable transmission device, in combination with a speed reducer and a speed increaser.

BACKGROUND ART

Continuously variable transmissions are conventionally used, for example, in vehicles to vary the speed. Among such continuously variable transmissions is known a continuously variable transmission that includes a continuously variable transmission device, such as a belt-driven continuously variable transmission device, in combination with a speed reducer and a speed increaser. Continuously variable transmissions of this type are configured as follows. The belt-driven continuously variable transmission device includes a pair of pulleys and an endless belt looped around the pulleys, and the speed reducer or the speed increaser includes a gear train in which a plurality of gears mesh with one another. Continuously variable transmissions of this type use a plurality of clutches as power transmission switching mechanisms for switching between establishing and interrupting power transmission in the power transmission paths. For such continuously variable transmissions, a configuration for increasing the gear ratio range of the continuously variable transmission as a whole is known as disclosed in Patent Document 1, for example. The configuration is such that the direction of power (torque) transmission of the belt-driven continuously variable transmission device can be switched between a first direction, from one pulley to the other pulley, and a second direction, from the other pulley to the one pulley.

RELATED ART DOCUMENTS

Patent Documents

[Patent document 1] WO 2013/175568

DISCLOSURE OF THE INVENTION

Problems to be Solved by the Invention

In cases such as disclosed in Patent Document 1, continuously variable transmissions that include a continuously variable transmission device capable of transmitting a driving force in the two, forward and reverse directions are provided with a meshing-type engagement mechanism (dog clutch). The meshing-type engagement mechanism is mounted between the continuously variable transmission device and the final output mechanism to serve as a power transmission switching mechanism. Dog clutches are mechanisms including an axially movable component, such as a sleeve, between one gear mounted to one rotation element and the other gear mounted to the other rotation element. The component, such as a sleeve, moves in the axial direction to switch between engagement and disengagement between the one rotation element and the other rotation element. In contrast, another configuration example for the power transmission switching mechanism described above is the friction clutch, in which engagement is accomplished by contact between friction members.

Compared with the friction clutch, the dog clutch is advantageous in that the total length can be shorter provided that the torques to be transferred are approximately the same. However, compared with the friction clutch, the dog clutch cannot efficiently absorb the rotational speed difference between the rotation elements. Thus, in particular, when one of the rotation elements is stopped and the other rotation element is rotating at a high rotational speed, it is difficult to engage the rotation elements with each other. In view of this, one possible approach may be to replace the dog clutch for transmitting power to the final output mechanism with a friction clutch. However, friction clutches are longer in overall length than dog clutches, and thus, if the dog clutch of the continuously variable transmission of Patent Document 1 is simply replaced with a friction clutch, the transmission will be increased in overall length, and as a result, the size and weight of the transmission may be increased. Furthermore, to avoid the increase in the overall length of the transmission, one possible approach may be to increase the number of shafts. However, increasing the number of shafts results in an increase in the weight of the transmission. In addition, there is another problem in that the additional shafts may dip into the oil that has accumulated at the bottom within the transmission case, and as a result, the friction associated with the operation of the continuously variable transmission may increase.

The present invention has been made in view of the foregoing problems. Accordingly, an object of the present invention is to provide a continuously variable transmission that uses friction clutches as power transmission switching mechanisms but without increasing the number of shafts and the overall length. The power transmission switching mechanisms are configured to switch between establishing and interrupting power transmission in the power transmission paths within the continuously variable transmission.

Means of Solving the Problems

In order to solve the above-described problems, according to one aspect of the present invention, a continuously variable transmission (1) includes an input shaft (13), a first output shaft (14), a second output shaft (15), a continuously variable transmission device (20), a first transmission path (51), a second transmission path (52), a final output mechanism (30), a first friction clutch (61), a second friction clutch (62), a third friction clutch (63), and a fourth friction clutch (64). The input shaft (13) is configured to receive a driving force input from a drive source (E). The first output shaft (14) and the second output shaft (15) are parallel to the input shaft (13). The continuously variable transmission device (20) includes a first pulley (21), mounted to the first output shaft (14), a second pulley (22), mounted to the second output shaft (15), and an endless belt (23), looped around the first pulley (21) and the second pulley (22). The first transmission path (51) is configured to reduce an input from the input shaft (13) and transmit the driving force to the continuously variable transmission device (20). The second transmission path (52) is configured to increase an input from the input shaft (13) and transmit the driving force to the continuously variable transmission device (20). The final output mechanism (30) is configured to output the driving force from the first output shaft (14) or the second output shaft (15). The first friction clutch (61) is coaxial with the input shaft (13) and configured to switch between establishing and interrupting power transmission from the input shaft

(13) to the first transmission path (51). The second friction clutch (62) is coaxial with the input shaft (13) and configured to switch between establishing and interrupting power transmission from the input shaft (13) to the second transmission path (52). The third friction clutch (63) is coaxial with the second output shaft (15) and configured to switch between establishing and interrupting power transmission from the second pulley (22) to the final output mechanism (30). The fourth friction clutch (64) is coaxial with the first output shaft (14) and configured to switch between establishing and interrupting power transmission from the first pulley (21) to the final output mechanism (30).

As described above, in the 3-shaft configuration of the input shaft (13), the first output shaft (14), and the second output shaft (15), four clutches are used. The first friction clutch (61) and the second friction clutch (62) are mounted coaxially with the input shaft (13). The third friction clutch (63) is mounted coaxially with the second output shaft (15). The fourth friction clutch (64) is mounted coaxially with the first output shaft (14). Thus, all the engagement elements are constituted by friction clutches, which have the function of absorbing rotational speed differences. As a result, even when there is a rotational speed difference, gear engagement is accomplished. Furthermore, the four friction clutches are distributed to the shafts, and this results in efficient use of the internal space of the 3-shaft configuration continuously variable transmission (1). Thus, although friction clutches are employed, the number of shafts is unchanged from the number in conventional configurations, and also, the increase in the overall length in the axial direction is prevented.

In the first aspect of the present invention, the continuously variable transmission (1) may be configured as follows. The first transmission path (51) may include a first transmission drive gear (51A), mounted to the input shaft (13) via the first friction clutch (61), and a first transmission driven gear (51B), mounted to the first output shaft (14). The second transmission path (52) may include a second transmission drive gear (52A), mounted to the input shaft (13) via the second friction clutch (62), and a second transmission driven gear (52B), mounted to the second output shaft (15). The continuously variable transmission (1) may include one side and an other side. The first transmission driven gear (51B) and the fourth friction clutch (64) may be mounted to the first output shaft (14) with the first transmission driven gear (51B) being on the one side and the fourth friction clutch (64) being on the other side, with the first pulley (21) being located in between. The third friction clutch (63) and the second transmission driven gear (52B) may be mounted to the second output shaft (15) with the third friction clutch (63) being on the one side and the second transmission driven gear (52B) being on the other side, with the second pulley (22) being located in between. Thus, the third friction clutch (63) and the fourth friction clutch (64) are respectively located on the one side and the other side in the axial direction with the continuously variable transmission device (20) located in between, and the first transmission driven gear (51B) and the second transmission driven gear (52B) are respectively located on the one side and the other side in the axial direction with the continuously variable transmission device (20) located in between. In this manner, the same types of components are distributed to the one side and the other side, with the continuously variable transmission device 20 located in between, in such a manner that one type of components and the other type of components are alternating. With this configuration, the space in the axial direction is utilized even more effectively, and as a result, although friction clutches are employed, the number of shafts is unchanged from the number in conventional configurations, and also, the increase in the overall length in the axial direction is prevented.

In the first aspect of the present invention, the continuously variable transmission (1) may further include a third transmission path (53) and a forward-reverse switching mechanism (70). The third transmission path (53) may be configured to reverse a rotational direction of the driving force from the input shaft (13) and transmit the driving force to the first output shaft (14). The forward-reverse switching mechanism (70) may be mounted to the input shaft (13) and configured to selectively switch between transmitting the driving force from the input shaft (13) to the second transmission path (52) and to the third transmission path (53). As described above, the forward-reverse switching mechanism (70) is configured to switch between the second transmission path (52) and the third transmission path (53). The second transmission path (52) is configured to increase the rotation of the input shaft (13) and the third transmission path (53) is configured to reverse the rotation of the input shaft (13). With this configuration, the inertia to be absorbed by the forward-reverse switching mechanism (70) at the time of forward-reverse switching is reduced, compared with conventional cases, in which forward-reverse switching mechanisms are configured to switch between a path for reducing the rotation of the input shaft and a path for reversing the rotation of the input shaft. As a result, even when there is a rotational speed difference, the forward-reverse switching operation is readily accomplished. Consequently, the forward and reverse control is improved.

In the first aspect of the present invention, the continuously variable transmission (1) may be configured as follows. The input shaft (13) may include a main input shaft (13A), a first auxiliary input shaft (13B), and a second auxiliary input shaft (13C). The main input shaft (13A) may be configured to receive the driving force input from the drive source (E). The first auxiliary input shaft (13B) may be coupled to the first transmission drive gear (51A) via the first friction clutch (61). The first auxiliary input shaft (13B) may be hollow. The first auxiliary input shaft (13B) and the main input shaft (13A) may share a common center of rotation. The second auxiliary input shaft (13C) may be coupled to the second transmission drive gear (52A) via the second friction clutch (62). The second auxiliary input shaft (13C) and the main input shaft (13A) may share the common center of rotation. The second auxiliary input shaft (13C) may extend through the first auxiliary input shaft (13B). Thus, the downstream side of the input shaft (13) is constituted by the dual structure of the first auxiliary input shaft (13B) and the second auxiliary input shaft (13C), and this results in the efficient arrangement of the first friction clutch (61) and the second friction clutch (62).

In the first aspect of the present invention, the continuously variable transmission (1) may be configured as follows. The first friction clutch (61) and the second friction clutch (62) may be coaxial with the input shaft (13) and closer to the drive source (E) than is the continuously variable transmission device (20). In this manner, the plurality of friction clutches (61, 62), which are coaxial with one another, are more efficiently arranged, and as a result, sufficient space is provided around the continuously variable transmission device (20).

In the first aspect of the present invention, the continuously variable transmission (1) may further include an intermediate transmission path (54), which is configured to transmit the driving force from the second output shaft (15)

to the first output shaft (14). When this configuration is employed, the output from the output shaft (15) is transmitted to the first output shaft (14) via the intermediate transmission path (54) before being transmitted to the final output mechanism (30). Thus, the outputs are eventually concentrated to the first output shaft (14). Accordingly, it is sufficient to provide the final drive gear (31) for the first output shaft (14) alone to accomplish the final output. As a result, a more efficient arrangement is achieved.

In the first aspect of the present invention, the continuously variable transmission (2), which is configured as described above, may further include a flywheel (80) between the drive source (E) and the input shaft (13). The flywheel (80) may be provided with a damper (81). Because of this configuration, further size reduction and weight reduction are achieved than in the case in which a torque converter (12) is provided between the drive source (E) and the input shaft (13). It should be noted that the above reference characters in parentheses correspond to the reference characters used for the constituent elements in the embodiments, which are examples of the present invention. The embodiments will be described below.

Effects of the Invention

The present invention provides a continuously variable transmission that uses friction clutches for engagement with the output side while avoiding increases in the number of shafts and the overall length.

MODE FOR CARRYING OUT THE INVENTION

Figure 1:
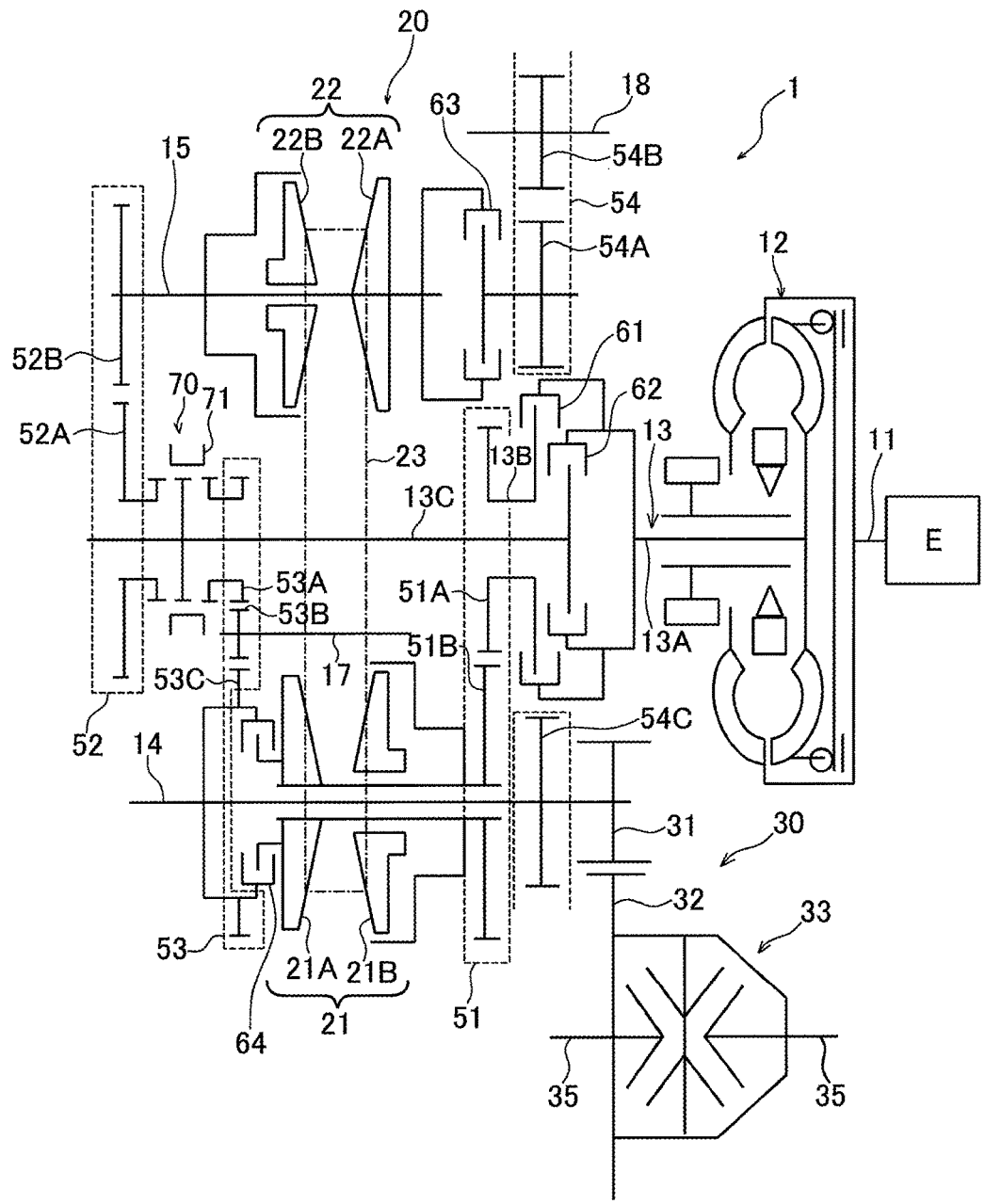
FIG. 1 is a skeleton diagram of a continuously variable transmission according to a first embodiment.
Figure 2:
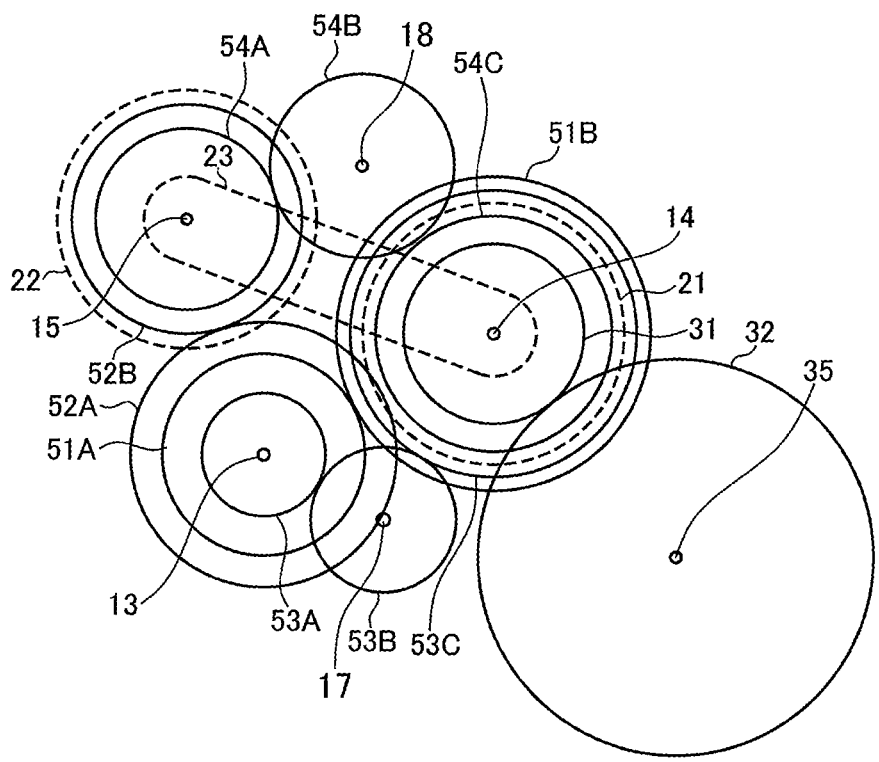
FIG. 2 is a schematic side view of the continuously variable transmission according to the first embodiment illustrating the shaft arrangement.

The first embodiment of the present invention will now be described in detail with reference to the accompanying drawings.
First Embodiment FIG. 1 is a skeleton diagram of a continuously variable transmission 1. FIG. 2 is a schematic side view of the continuously variable transmission 1 illustrating the shaft arrangement. FIG. 2 conceptually illustrates the shaft and gear arrangement and schematically illustrates the continuously variable transmission 1 as viewed in the axial direction.

As illustrated in FIG. 1, the continuously variable transmission 1, which can be mounted in a vehicle, includes a torque converter 12 between a crankshaft 11 of a drive source E and an input shaft 13. The drive source E in this embodiment is an engine. Clutch partial engagement control at the start of the vehicle is performed by the torque converter 12. The continuously variable transmission 1 includes the input shaft 13, a first output shaft 14, and a second output shaft 15. The input shaft 13 is coupled to the drive source E via the torque converter 12. The first output shaft 14 and the second output shaft 15 are located parallel to the input shaft 13.

As illustrated in FIGS. 1 and 2, the input shaft 13 is made up of a main input shaft 13A, a first auxiliary input shaft 13B and a second auxiliary input shaft 13C. The driving force from the drive source E is input into the main input shaft 13A. The first auxiliary input shaft 13B is hollow and coupled via a first friction clutch 61. The first auxiliary input shaft 13B and the main input shaft 13A share a common center of rotation. The second auxiliary input shaft 13C is coupled via a second friction clutch 62. The second auxiliary input shaft 13C and the main input shaft 13A share the common center of rotation. The second auxiliary input shaft 13C extends through the first auxiliary input shaft 13B.

A continuously variable transmission device 20 is provided between the first output shaft 14 and the second output shaft 15. The continuously variable transmission device 20 includes a first pulley 21, a second pulley 22, and an endless belt 23. The first pulley 21 is mounted to the first output shaft 14. The second pulley 22 is mounted to the second output shaft 15. The endless belt 23 is looped around the first pulley 21 and the second pulley 22. The groove widths of the first pulley 21 and the second pulley 22 increase and decrease in an inverse manner relative to each other via hydraulic pressure, to continuously vary the gear ratio between the first output shaft 14 and the second output shaft 15. The first pulley 21 includes a first stationary pulley 21A and a first movable pulley 21B. The first stationary pulley 21A is secured to an inner shaft 14A of the first output shaft 14. The first movable pulley 21B is capable of moving toward and away from the first stationary pulley 21A. The second pulley 22 includes a second stationary pulley 22A and a second movable pulley 22B. The second stationary pulley 22A is secured to the second output shaft 15. The second movable pulley 22B is capable of moving toward and away from the second stationary pulley 22A.

A first transmission path 51 is provided between the input shaft 13 and the first output shaft 14. The first transmission path 51 reduces the input from the input shaft 13 and transmits the driving force to the continuously variable transmission device 20. The first transmission path 51 includes a first transmission drive gear 51A and a first transmission driven gear 51B. The first transmission drive gear 51A is mounted to the input shaft 13. The first transmission driven gear 51B is mounted to an outer circumferential shaft 14B of the first output shaft 14. The gear ratio between the first transmission drive gear 51A and the first transmission driven gear 51B is greater than one. Thus, the first transmission path 51 functions as a speed reducing gear train that reduces the driving force from the input shaft 13 and transmits the driving force.

A second transmission path 52 is provided between the input shaft 13 and the second output shaft 15. The second transmission path 52 increases the input from the input shaft 13 and transmits the driving force to the continuously variable transmission device 20. The second transmission path 52 includes a second transmission drive gear 52A and a second transmission driven gear 52B. The second transmission drive gear 52A is mounted to the input shaft 13. The second transmission driven gear 52B is mounted to the second output shaft 15. The gear ratio between the second transmission drive gear 52A and the second transmission driven gear 52B is smaller than one. Thus, the second transmission path 52 functions as a speed increasing gear train that increases the driving force from the input shaft 13 and transmits the driving force to the continuously variable transmission device 20.

A third transmission path 53 is provided between the input shaft 13 and the first output shaft 14. The third transmission path 53 reverses the rotational direction of the driving force from the input shaft 13 and transmits the driving force to the first output shaft 14. The third transmission path 53 includes a third transmission drive gear 53A, a third transmission driven gear 53C, and a third transmission idler gear 53B. The third transmission drive gear 53A is mounted to the input shaft 13. The third transmission driven gear 53C is mounted to the first output shaft 14. The third transmission idler gear 53B is mounted between the third transmission drive gear 53A and the third transmission driven gear 53C. The third transmission idler gear 53B is supported on an idler shaft 17. Because of the presence of the third transmission idler gear 53B, the third transmission path 53 functions as a gear train that reverses the rotational direction of the driving force and transmits the driving force.

An intermediate transmission path 54 is provided between the first output shaft 14 and the second output shaft 15. The intermediate transmission path 54 transmits the driving force from the second output shaft 15 to the first output shaft 14. The intermediate transmission path 54 includes an intermediate transmission drive gear 54A, an intermediate transmission driven gear 54C, and an intermediate transmission idler gear 54B. The intermediate transmission drive gear 54A is mounted to the second output shaft 15. The intermediate transmission driven gear 54C is mounted to the first output shaft 14. The intermediate transmission idler gear 54B is provided between the intermediate transmission drive gear 54A and the intermediate transmission driven gear 54C. The intermediate transmission idler gear 54B is supported on an idler shaft 18. In FIG. 1, the intermediate transmission idler gear 54B and the intermediate transmission driven gear 54C are not contiguous to each other, but in reality, as illustrated in FIG. 2, the intermediate transmission idler gear 54B and the intermediate transmission driven gear 54C are contiguous to each other and mesh with (engage with) each other. In this embodiment, the intermediate transmission member for transmitting the driving force from the intermediate transmission drive gear 54A to the intermediate transmission driven gear 54C is the intermediate idler gear 54B. However, the use of a gear may not necessarily be required. For example, a chain may be looped over the second output shaft 15 and the first output shaft 14 to transmit the driving force.

A forward-reverse switching mechanism 70 is mounted coaxially with the input shaft 13. The forward-reverse switching mechanism 70 is configured to selectively switch between transmitting the driving force from the input shaft 13 to the second transmission path 52 and to the third transmission path 53. The second transmission drive gear 52A and the third transmission drive gear 53A are supported on the second auxiliary input shaft 13C of the input shaft 13 so as to be rotatable relative to each other. When a sleeve 71 of the forward-reverse switching mechanism 70 is moved from a neutral position to the left in the drawing, the second transmission drive gear 52A is coupled to the second auxiliary input shaft 13C of the input shaft 13 to transmit the driving force from the input shaft 13 to the second transmission path 52. On the other hand, when the sleeve 71 of the forward-reverse switching mechanism 70 is moved from the neutral position to the right in the drawing, the third transmission drive gear 53A is coupled to the second auxiliary input shaft 13C of the input shaft 13 to transmit the driving force from the input shaft 13 to the third transmission path 53.

A final output mechanism 30 is provided downstream of the first output shaft 14. The final output mechanism 30 outputs the driving force transmitted to the output shaft 14. The final output mechanism 30 includes a final drive gear 31, a differential gear 33, and a drive shaft 35. The drive gear 31 is mounted to the first output shaft 14. The differential gear 33 includes, on the outer circumference, a final driven gear 32, which meshes with the final drive gear 31. The drive shaft 35 is provided to transmit the driving force divided by the differential gear 33 to the left and right drive wheels, which are not illustrated. In this embodiment, the driving force from the second output shaft 15 to the differential gear 33 of the final output mechanism 30 is transmitted to the final output mechanism 30 after being transmitted to the first output shaft 14 via the intermediate transmission path 54. However, this is not a limitation. For example, alternatively, a final drive gear may be mounted to the second output shaft 15 and the driving force of the second output shaft 15 may be transmitted to the final output mechanism 30 without being transmitted to the intermediate transmission path 54.

Next, with reference to FIG. 1, an arrangement and configuration of the power transmission switching mechanisms of the continuously variable transmission 1 will be described. The power transmission switching mechanisms are configured to switch between establishing and interrupting power transmission in the power transmission paths. In the continuously variable transmission 1 of this embodiment, four friction clutches are used as the power transmission switching mechanisms. Specifically, the first friction clutch 61 is mounted coaxially with the input shaft 13 and configured to switch between establishing and interrupting power transmission from the input shaft 13 to the first transmission path 51. The second friction clutch 62 is mounted coaxially with the input shaft 13 and configured to switch between establishing and interrupting power transmission from the input shaft 13 to the second transmission path 52. The third friction clutch 63 is mounted coaxially with the second output shaft 15 and configured to switch between establishing and interrupting power transmission from the second pulley 22 to the final output mechanism 30. The fourth friction clutch 64 is mounted coaxially with the first output shaft 14 and configured to switch between establishing and interrupting power transmission from the first pulley 21 to the final output mechanism 30.

Specifically, the first friction clutch 61 is located between the first input shaft 13 and the first auxiliary input shaft 13B. The second friction clutch 62 is located between the first input shaft 13 and the second auxiliary input shaft. The third friction clutch 63 is located between the second stationary pulley 22A and the intermediate transmission drive gear 54A, which are mounted to the second output shaft 15. The fourth friction clutch 64 is located between the first output shaft 14 and third transmission driven gear 53C and the first stationary pulley 21A.

The first friction clutch 61 and the second friction clutch 62 are coaxial with the input shaft 13 and closer to the drive source E than is the continuously variable transmission device 20. The third friction clutch 63 is closer to the drive source E than is the second pulley 22 and the fourth friction clutch 64 is farther from the drive source E than is the first pulley 21.

Figure 3:
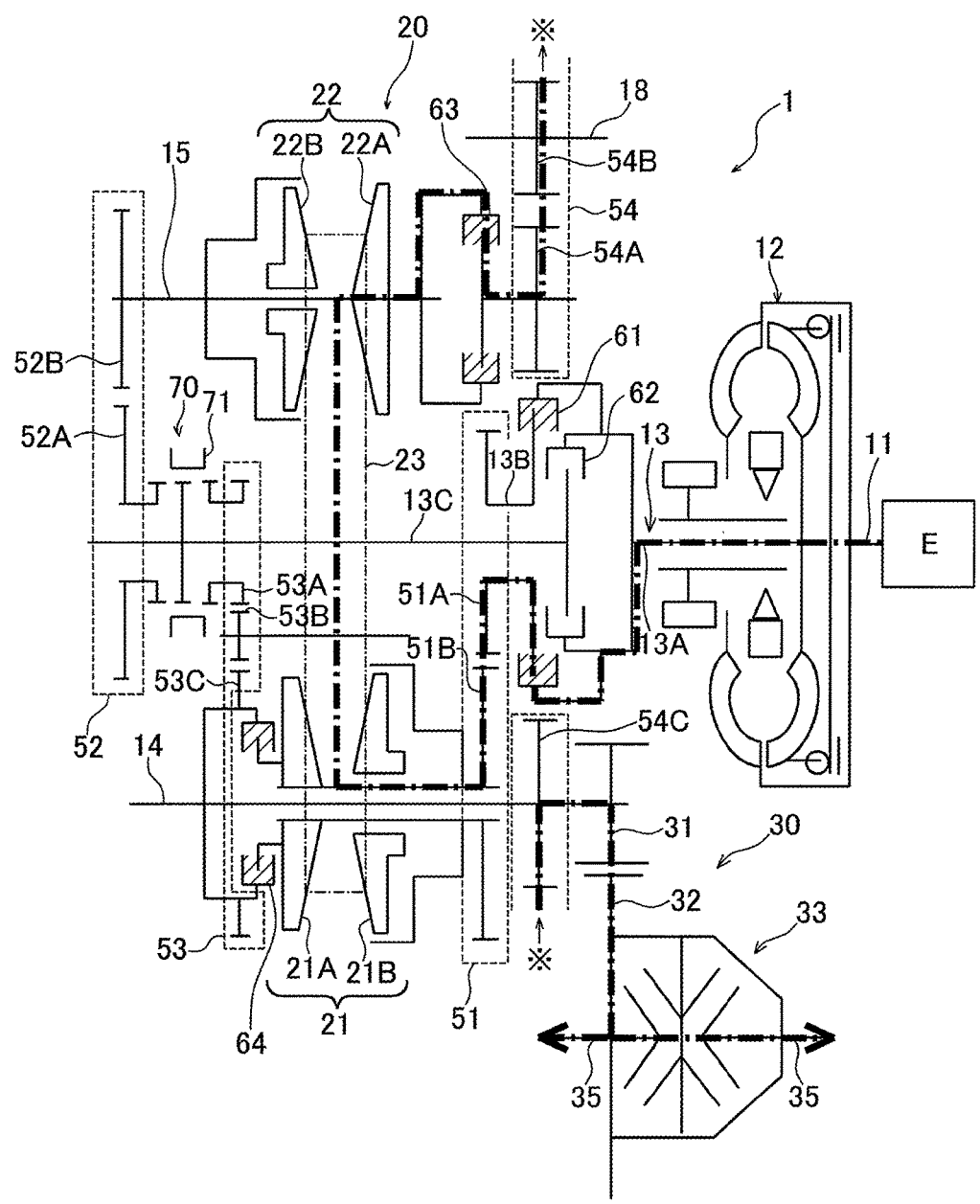
FIG. 3 is a skeleton diagram of the continuously variable transmission illustrating a power transmission path in a LOW mode.
Figure 4:
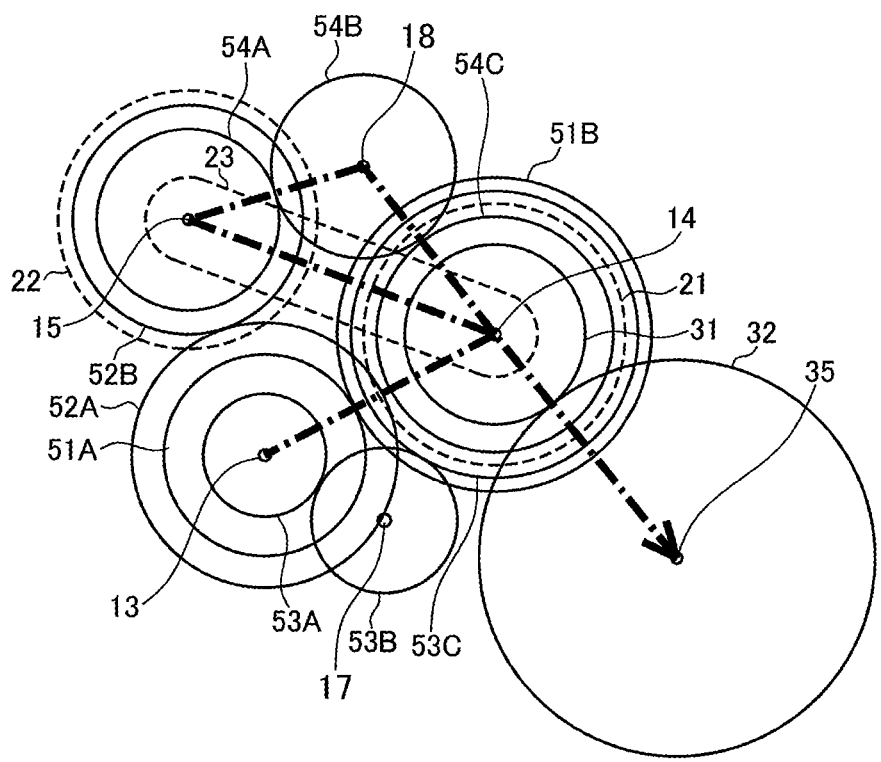
FIG. 4 is a schematic side view of the continuously variable transmission illustrating the power transmission path in the LOW mode.

Next, the power transmission paths of the continuously variable transmission 1 in various transmission modes will be described. The continuously variable transmission 1 is configured as described above. Firstly, described below is a case in which a LOW mode (low speed mode) is set on the continuously variable transmission 1. FIGS. 3 and 4 illustrate a power transmission path in the LOW mode. In the LOW mode, the friction clutch 61 is engaged, whereas the second friction clutch 62 is disengaged. Thus, the driving force transmitted from the drive source E to the main input shaft 13A is transmitted only to the first auxiliary input shaft 13B via the first friction clutch 61 and not transmitted to the second auxiliary input shaft 13C, which is downstream of the second friction clutch 62. In the LOW mode, the third friction clutch 63 and the fourth friction clutch 64 are engaged.

Consequently, as illustrated in FIGS. 3 and 4, the driving force of the drive source E is transmitted to the drive wheels via the path: crankshaft 11→torque converter 12→main input shaft 13A→first auxiliary input shaft 13B→first transmission drive gear 51A→first transmission driven gear 51B→first output shaft 14→first pulley 21→endless belt 23→second pulley 22→second output shaft 15→intermediate transmission drive gear 54A→intermediate transmission idler gear 54B→intermediate transmission driven gear 54C→first output shaft 14→final drive gear 31→final driven gear 32→differential gear 33→drive shaft 35.

Figure 5:
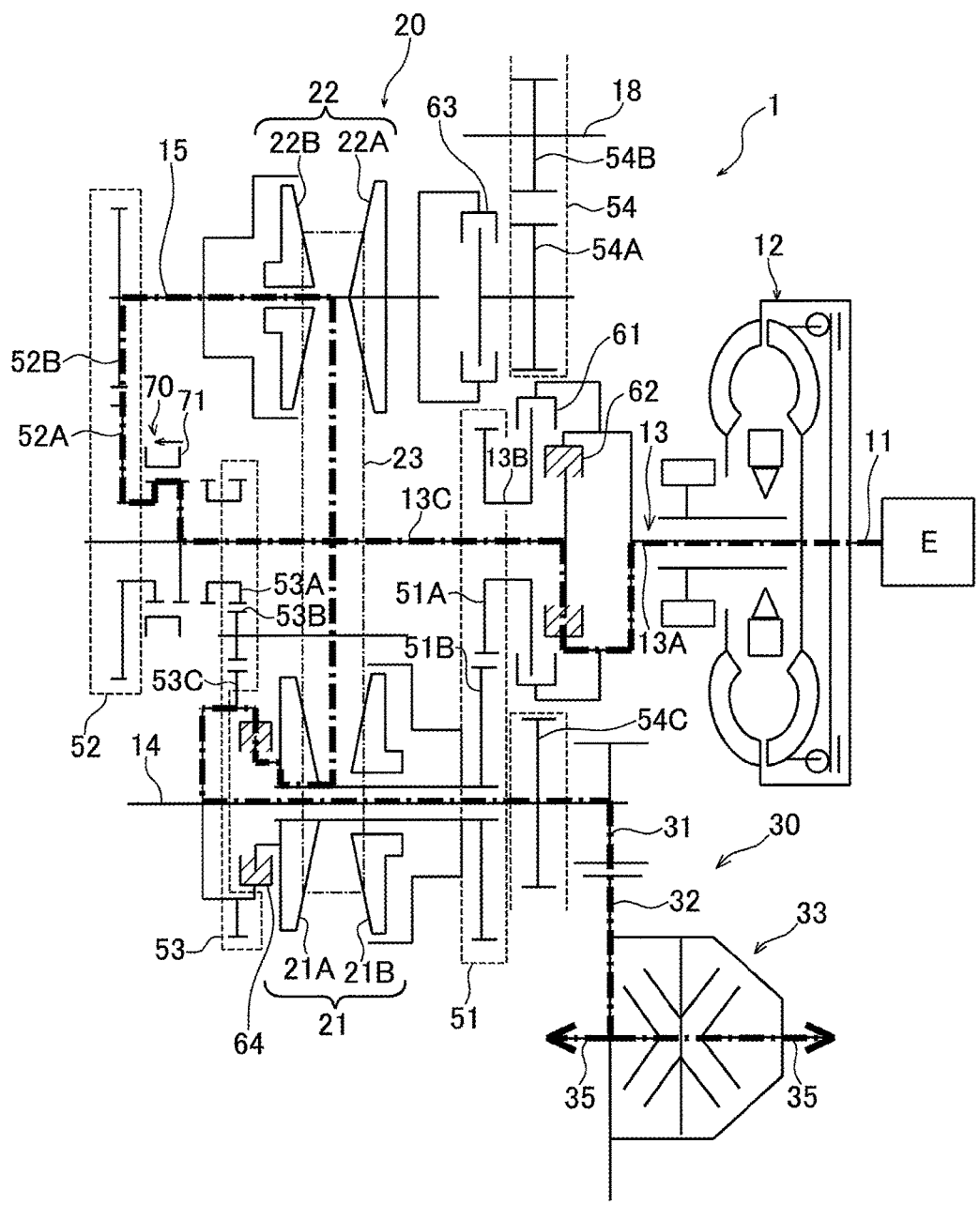
FIG. 5 is a skeleton diagram of the continuously variable transmission illustrating a power transmission path in a HI mode.
Figure 6:
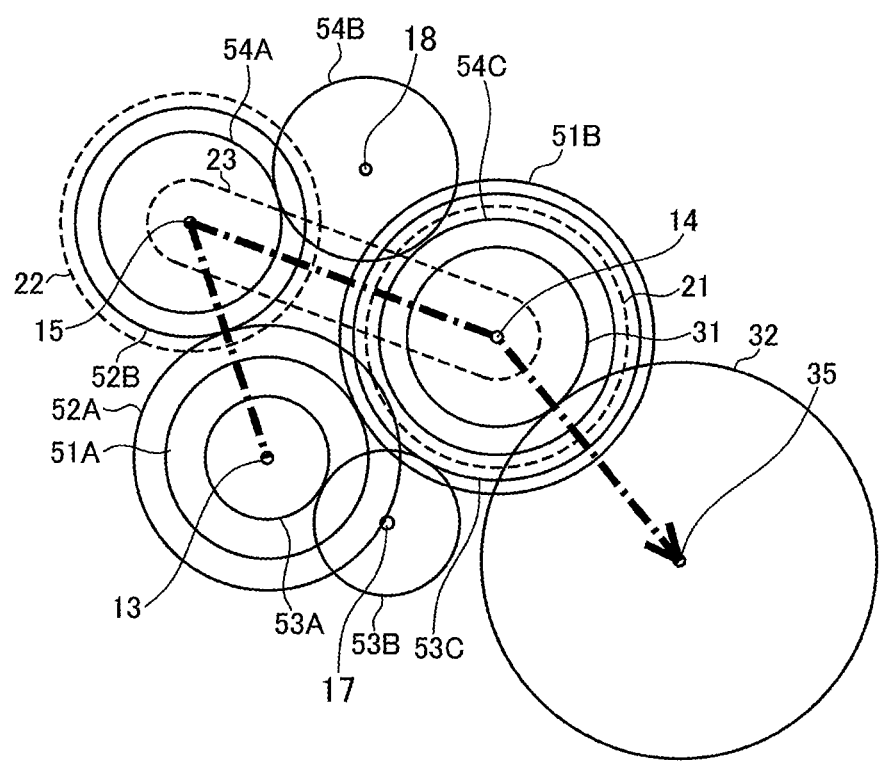
FIG. 6 is a schematic side view of the continuously variable transmission illustrating the power transmission path in the HI mode.

Next, described below is a case in which a HI mode (high speed mode) is set on the continuously variable transmission 1. FIGS. 5 and 6 illustrate a power transmission path in the HI mode. In the HI mode, the friction clutch 61 is disengaged, whereas the second friction clutch 62 is engaged. Thus, the driving force transmitted from the drive source E to the main input shaft 13A is transmitted only to the second auxiliary input shaft 13C via the second friction clutch 62 and not transmitted to the first auxiliary input shaft 13B, which is downstream of the first friction clutch 61. In the HI mode, the third friction clutch 63 is disengaged, whereas the fourth friction clutch 64 is engaged. The sleeve 71 of the forward-reverse switching mechanism 70 is moved to the HI side (left in the drawing) to engage the second auxiliary input shaft 13C with the second transmission drive gear 52A.

Consequently, as illustrated in FIGS. 5 and 6, the driving force of the drive source E is transmitted to the drive wheels via the path: crankshaft 11→torque converter 12→main input shaft 13A→second auxiliary input shaft 13C→second transmission drive gear 52A→second transmission driven gear 52B→second output shaft 15→second pulley 22→endless belt 23→first pulley 21→first output shaft 14→final drive gear 31→final driven gear 32→differential gear 33→drive shaft 35.

Figure 7:
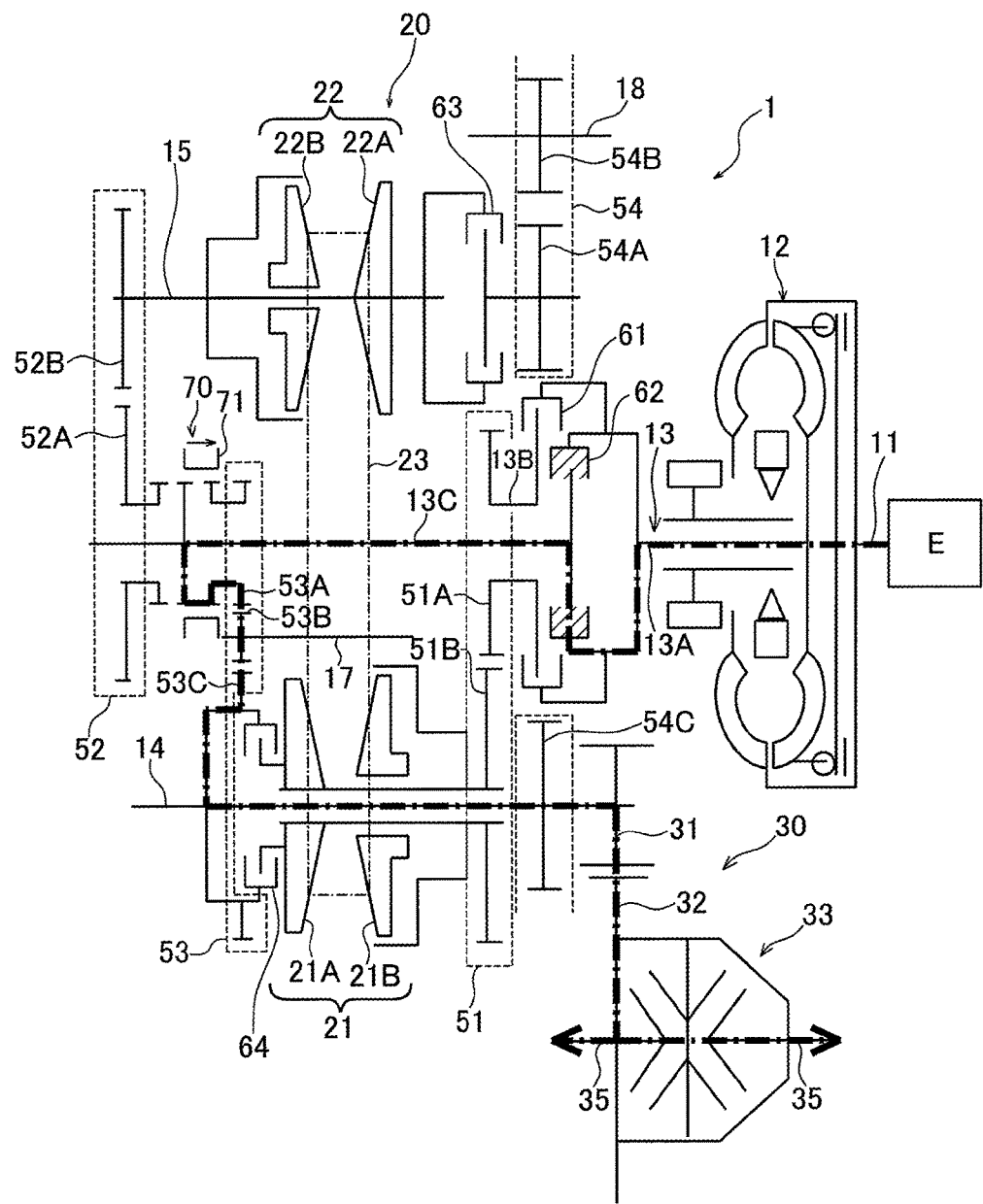
FIG. 7 is a skeleton diagram of the continuously variable transmission illustrating a power transmission path in an RVS mode.
Figure 8:
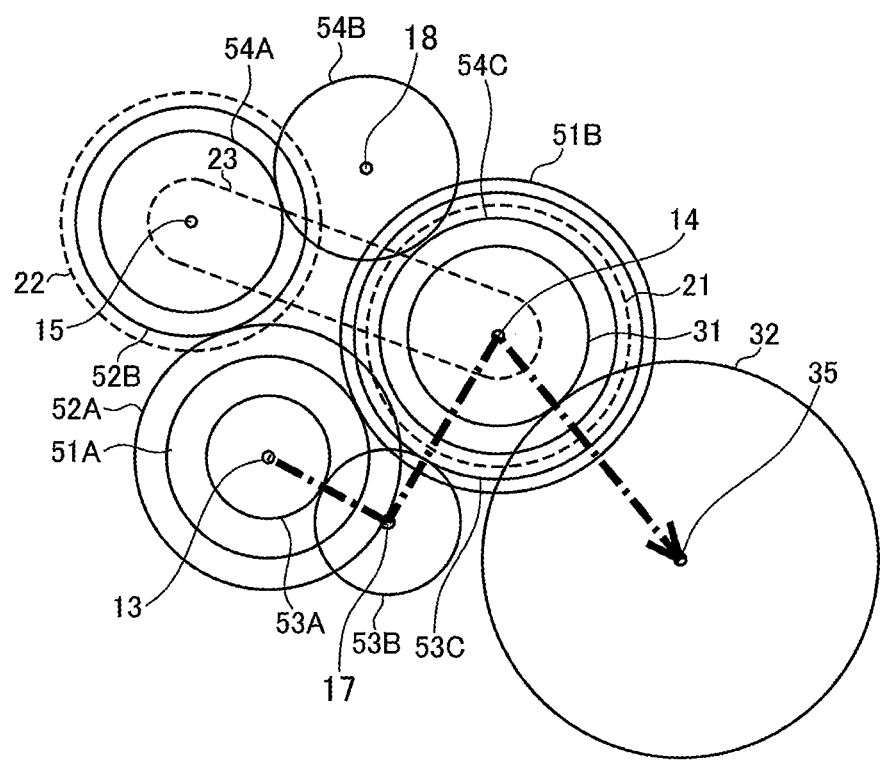
FIG. 8 is a schematic side view of the continuously variable transmission illustrating the power transmission path in the RVS mode.

Next, described below is a case in which an RVS mode (reverse mode) is set on the continuously variable transmission 1. FIGS. 7 and 8 illustrate a power transmission path in the RVS mode. In the RVS mode, the friction clutch 61 is disengaged, whereas the second friction clutch 62 is engaged. Thus, the driving force transmitted from the drive source E to the main input shaft 13A is transmitted only to the second auxiliary input shaft 13C via the second friction clutch 62 and not transmitted to the first auxiliary input shaft 13B, which is downstream of the first friction clutch 61. In the RVS mode, the fourth friction clutch 64 is disengaged. The sleeve 71 of the forward-reverse switching mechanism 70 is moved to the RVS side (right in the drawing) to engage the second auxiliary input shaft 13C with the third transmission drive gear 53A.

Consequently, as illustrated in FIGS. 7 and 8, the driving force of the drive source E is transmitted to the drive wheels via the path: crankshaft 11→torque converter 12→main input shaft 13A→second auxiliary input shaft 13C→third transmission drive gear 53A→third transmission idler gear 53B→third transmission driven gear 53C→first output shaft 14→final drive gear 31→final driven gear 32→differential gear 33→drive shaft 35. As described above, in the RVS mode of this embodiment, the continuously variable transmission device 20 is not used.

With the configuration described above, the continuously variable transmission 1 of this embodiment employs the 3-shaft configuration of the input shaft 13, the first output shaft 14, and the second output shaft 15 and uses four clutches. The first friction clutch 61 and the second friction clutch 62 are mounted coaxially with the input shaft 13. The third friction clutch 63 is mounted coaxially with the second output shaft 15. The fourth friction clutch 64 is mounted coaxially with the first output shaft 14. Thus, all the power transmission switching mechanisms (engagement elements) are friction clutches, which have the function of absorbing rotational speed differences. As a result, even when there is a rotational speed difference between upstream and downstream of the power transmission switching mechanism, switching between establishing and interrupting power transmission can be accomplished. Furthermore, the four friction clutches are distributed to the shafts, and this results in efficient use of the internal space of the 3-shaft configuration continuously variable transmission 1. Thus, although friction clutches are employed, the number of shafts is unchanged from the number in conventional configurations, and also, the increase in the overall length in the axial direction is prevented.

The first transmission driven gear 51B and the fourth friction clutch 64 are mounted to the first output shaft 14 with the first transmission driven gear 51B being on one side and the fourth friction clutch 64 being on an other side, with the first pulley 21 being located in between. The one side is closer to the drive source E and the other side is farther from the drive source E. The third friction clutch 63 and the second transmission driven gear 52B are mounted to the second output shaft 15 with the third friction clutch 63 being on the one side and the second transmission driven gear 52B being on the other side, with the second pulley 22 being located in between. Thus, the third friction clutch 63 and the fourth friction clutch 64 are respectively located on the one side and the other side in the axial direction with the continuously variable transmission device 20 located in between, and the first transmission driven gear 51B and the second transmission driven gear 52B are respectively located on the one side and the other side in the axial direction with the continuously variable transmission device 20 located in between. In this manner, the components of the same type are distributed to the one side and the other side in a staggered manner with the continuously variable transmission device 20 located in between. With this configuration, the space in the axial direction is utilized even more effectively, and as a result, although friction clutches are employed, the number of shafts is unchanged from the number in conventional configurations, and also, the increase in the overall length in the axial direction is prevented.

Furthermore, the forward-reverse switching mechanism 70 is configured to switch between the second transmission path 52 and the third transmission path 53. The second transmission path 52 is configured to increase the rotation of the input shaft 13 and the third transmission path 53 is configured to reverse the rotation of the input shaft 13. Thus, with the configuration of this embodiment, the inertia to be absorbed by the forward-reverse switching mechanism 70 at the time of forward-reverse switching is reduced, compared with conventional cases, in which forward-reverse switching mechanisms are configured to switch between a path for reducing the rotation of the input shaft and a path for reversing the rotation of the input shaft. As a result, the operation of forward-reverse switching is facilitated even when there is a rotational speed difference. Accordingly, responsiveness in control that involves forward-reverse switching is improved.

Furthermore, the downstream side of the input shaft 13 is constituted by the dual structure of the first auxiliary input shaft 13B and the second auxiliary input shaft 13C, and this results in the efficient arrangement of the first friction clutch 61 and the second friction clutch 62. Furthermore, the first friction clutch 61 and the second friction clutch 62 are mounted coaxially with the input shaft 13 and located closer to the drive source E than is the continuously variable transmission device 20. In this manner, the plurality of friction clutches (first friction clutch 61 and second friction clutch 62), which are coaxially mounted, are more efficiently arranged, and as a result, sufficient space is provided around the continuously variable transmission device 20.

Furthermore, because of the presence of the intermediate transmission path 54, which transmits the driving force from the second output shaft 15 to the first output shaft 14, the outputs are eventually concentrated to the first output shaft 14 regardless of the mode selected from among the LOW mode, the HI mode, and the RVS mode. Accordingly, it is sufficient to provide the final drive gear 31 for the first output shaft 14 alone to accomplish the final output.

Second Embodiment

Figure 9:
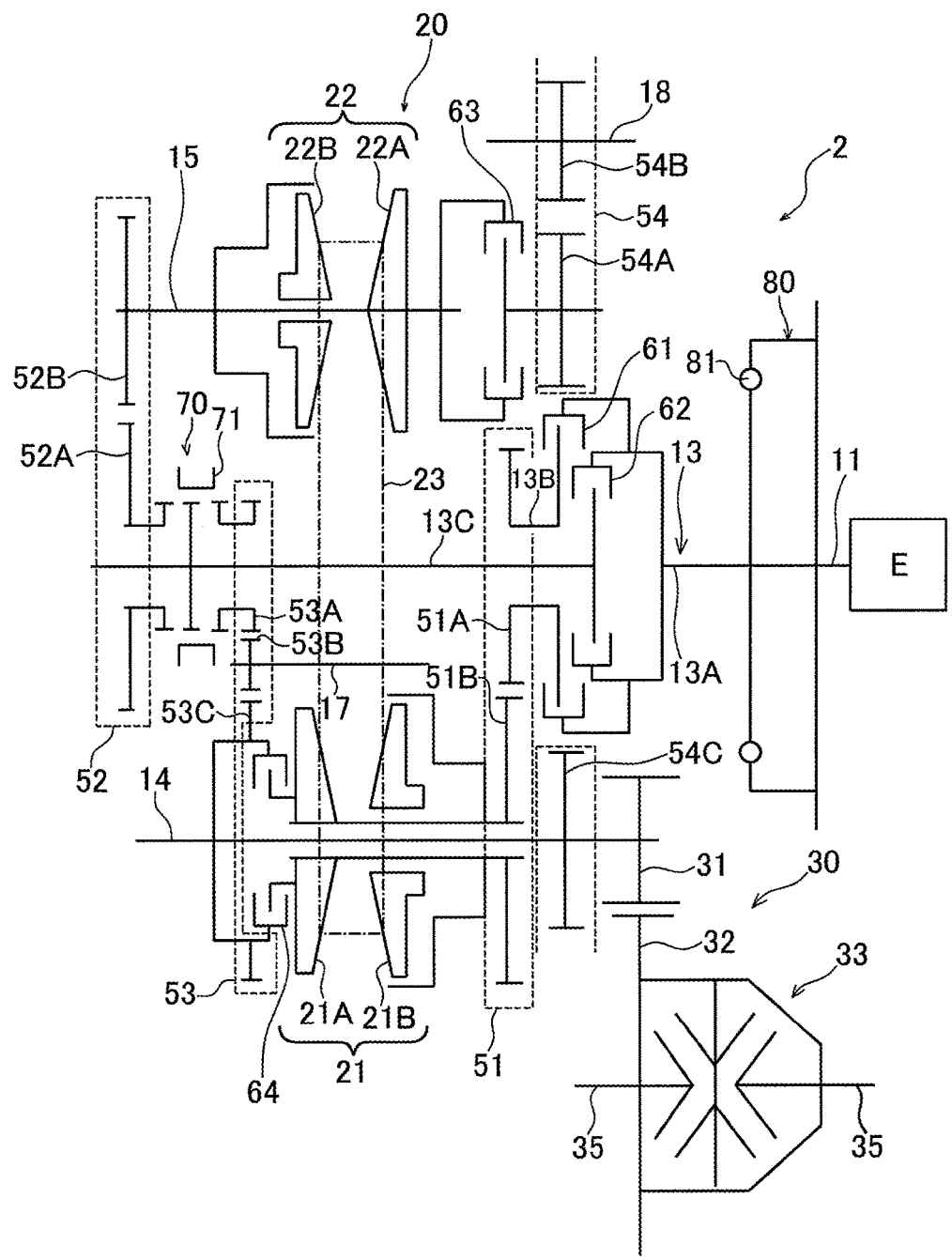
FIG. 9 is a skeleton diagram of a continuously variable transmission according to a second embodiment.

Next, the second embodiment of the present invention will be described. FIG. 9 is a skeleton diagram of a continuously variable transmission 2 according to the second embodiment. Elements similar to those of the above-described first embodiment are designated by the same reference characters, and detailed descriptions of the elements are not provided. In the first embodiment, the torque converter 12 is provided between the crankshaft 11 of the drive source E and the main input shaft 13A. In contrast, in the case of the continuously variable transmission 2 of this embodiment, a flywheel 80 is provided between the crankshaft 11 of the drive source E and the input shaft 13, as illustrated in FIG. 9. The flywheel 80 is provided with a damper 81. In the case of the continuously variable transmission 2, which does not include a torque converter at the input shaft 13A, clutch partial engagement control at the start of the vehicle is performed by the first friction clutch 61 or the third friction clutch 63.

Thus, when the flywheel 80 with the damper 81 is provided between the drive source E and the input shaft 13, further size reduction and weight reduction of the continuously variable transmission 2 are achieved than in the case in which the torque converter 12 is provided between the drive source E and the input shaft 13.

Clutch partial engagement control at the start of the vehicle is basically performed by the third friction clutch 63. When the clutch partial engagement control is performed by the third friction clutch 63 as described, there is an advantage in that, since transmission of the driving force between the input shaft 13 and the continuously variable transmission device 20 continues even if the third friction clutch 63 is disengaged, gear shifting can be performed by the continuously variable transmission device 20. On the other hand, when the clutch partial engagement control is performed by the first friction clutch 61, the clutch control can be performed before the rotation of the driving force from the drive source E is reduced. This configuration is advantageous in that the clutch control is performed in a lower torque region and therefore the control is facilitated.

While embodiments of the present invention have been described above, the present invention is not limited to the above embodiments, and various modifications may be made within the scope of the technical ideas described in the claims, specification, and drawings.

The invention claimed is:

1. A continuously variable transmission comprising:
    an input shaft configured to receive a driving force input from a drive source;
    first and second output shafts parallel to the input shaft;
    a continuously variable transmission device comprising:
        a first pulley mounted to the first output shaft;
        a second pulley mounted to the second output shaft; and
        an endless belt looped around the first pulley and the second pulley;
    a first transmission path configured to reduce an input from the input shaft and transmit the driving force to the continuously variable transmission device;
    a second transmission path configured to increase an input from the input shaft and transmit the driving force to the continuously variable transmission device;
    a final output mechanism configured to output the driving force from the first output shaft or the second output shaft;
    a first friction clutch coaxial with the input shaft and configured to switch between establishing and interrupting power transmission from the input shaft to the first transmission path;
    a second friction clutch coaxial with the input shaft and configured to switch between establishing and interrupting power transmission from the input shaft to the second transmission path;
    a third friction clutch coaxial with the second output shaft and configured to switch between establishing and interrupting power transmission from the second pulley to the final output mechanism; and
    a fourth friction clutch coaxial with the first output shaft and configured to switch between establishing and interrupting power transmission from the first pulley to the final output mechanism.

2. The continuously variable transmission according to claim 1,
    wherein the first transmission path comprises
        a first transmission drive gear mounted to the input shaft via the first friction clutch, and
        a first transmission driven gear mounted to the first output shaft,
    wherein the second transmission path comprises
        a second transmission drive gear mounted to the input shaft via the second friction clutch, and a second transmission driven gear mounted to the second output shaft, wherein the continuously variable transmission comprises one side and an other side, wherein the first transmission driven gear and the fourth friction clutch are mounted to the first output shaft with the first transmission driven gear being on the one side and the fourth friction clutch being on the other side, with the first pulley being located in between, and wherein the third friction clutch and the second transmission driven gear are mounted to the second output shaft with the third friction clutch being on the one side and the second transmission driven gear being on the other side, with the second pulley being located in between.

3. The continuously variable transmission according to claim 1, further comprising:

a third transmission path configured to reverse a rotational direction of the driving force from the input shaft and transmit the driving force to the first output shaft; and a forward-reverse switching mechanism mounted to the input shaft and configured to selectively switch between transmitting the driving force from the input shaft to the second transmission path and to the third transmission path.

4. The continuously variable transmission according to claim 1, wherein the input shaft comprises a main input shaft configured to receive the driving force input from the drive source, a first auxiliary input shaft coupled to the first transmission drive gear via the first friction clutch, the first auxiliary input shaft being hollow, the first auxiliary input shaft and the main input shaft sharing a common center of rotation, and a second auxiliary input shaft coupled to the second transmission drive gear via the second friction clutch, the second auxiliary input shaft and the main input shaft sharing the common center of rotation, the second auxiliary input shaft extending through the first auxiliary input shaft.

5. The continuously variable transmission according to claim 1, wherein the first friction clutch and the second friction clutch are coaxial with the input shaft and closer to the drive source than is the continuously variable transmission device.

6. The continuously variable transmission according to claim 1, further comprising an intermediate transmission path configured to transmit the driving force from the second output shaft to the first output shaft.

7. The continuously variable transmission according to claim 1, further comprising a flywheel between the drive source and the input shaft, the fly wheel comprising a damper.

* * * * *